United States Patent
Conrad et al.

(10) Patent No.: US 9,550,935 B2
(45) Date of Patent: *Jan. 24, 2017

(54) METHOD OF CONTROLLING GAS HYDRATES IN FLUID SYSTEMS

(71) Applicant: Nalco Company, Naperville, IL (US)

(72) Inventors: Peter G. Conrad, Sugar Land, TX (US); Erick J. Acosta, Sugar Land, TX (US); Kevin P. McNamee, Stafford, TX (US); Brian Bennett, Sugar Land, TX (US); Olga E. S. Lindeman, Brookfield, WI (US); Joseph R. Carlise, Lisle, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,618

(22) Filed: Dec. 24, 2014

(65) Prior Publication Data
US 2015/0119299 A1 Apr. 30, 2015

Related U.S. Application Data

(63) Continuation of application No. 12/253,504, filed on Oct. 17, 2008, now Pat. No. 8,921,478.

(51) Int. Cl.
*C09K 8/524* (2006.01)
*C10L 3/10* (2006.01)
*C08F 220/56* (2006.01)
*C10L 3/00* (2006.01)

(52) U.S. Cl.
CPC ............ *C09K 8/524* (2013.01); *C08F 220/56* (2013.01); *C10L 3/003* (2013.01); *C10L 3/10* (2013.01); *C10L 3/108* (2013.01); *C09K 2208/22* (2013.01)

(58) Field of Classification Search
CPC .............................. C09K 8/524; C09K 2208/22
See application file for complete search history.

(56) References Cited

U.S. PATENT DOCUMENTS

| | | |
|---|---|---|
| 3,317,556 A | 5/1967 | Rose et al. |
| 3,894,962 A | 7/1975 | Allain et al. |
| 4,081,402 A | 3/1978 | Levy et al. |
| 4,652,623 A | 3/1987 | Chen et al. |
| 4,673,716 A | 6/1987 | Siano et al. |
| 4,980,378 A | 12/1990 | Wong et al. |
| 5,600,044 A * | 2/1997 | Colle ............ C09K 8/52 137/13 |
| 5,981,816 A | 11/1999 | Sinquin et al. |
| 6,177,497 B1 | 1/2001 | Klug et al. |
| 6,194,622 B1 | 2/2001 | Peiffer et al. |
| 6,319,971 B1 | 11/2001 | Kelland et al. |
| 6,398,967 B2 | 6/2002 | Sparapany et al. |
| 6,451,891 B1 | 9/2002 | Thieu et al. |
| 6,559,233 B2 | 5/2003 | Bavouzet et al. |
| 6,702,946 B1 | 3/2004 | Huang et al. |
| 7,311,144 B2 | 12/2007 | Conrad |
| 7,408,004 B2 | 8/2008 | Struck et al. |
| 7,550,339 B2 | 6/2009 | Forbes |
| 8,921,478 B2 * | 12/2014 | Conrad ............ C08F 220/56 210/698 |
| 2003/0130454 A1 | 7/2003 | Seya et al. |
| 2004/0024152 A1 | 2/2004 | Toyama et al. |
| 2004/0163306 A1 | 8/2004 | Dahlmann et al. |
| 2006/0094913 A1 | 5/2006 | Spratt |
| 2008/0058229 A1 * | 3/2008 | Berkland ............ C09K 8/516 507/211 |
| 2008/0113890 A1 | 5/2008 | Moreton et al. |
| 2010/0008733 A1 | 1/2010 | Stiesdal |

FOREIGN PATENT DOCUMENTS

| | | |
|---|---|---|
| EP | 0 446 616 A1 | 9/1991 |
| GB | 962242 | 7/1964 |
| WO | 02/40433 A1 | 5/2002 |
| WO | 2004/032824 A2 | 4/2004 |
| WO | 2004/041884 A1 | 5/2004 |
| WO | 2005/005567 A1 | 1/2005 |
| WO | 2006/051265 A1 | 5/2006 |
| WO | 2008/089262 A1 | 7/2008 |

OTHER PUBLICATIONS

Billmeyer, Jr., F. W., Textbook of Polymer Science, Third Edition, 1984, p. 5, John Wiley & Sons, Inc.

Fedi, V., et al., "Insertion of an Aspartic Acid Moiety Into Cyclic Pseudopeptides: Synthesis and Biological Characterization of Potent Antagonists for the Human Tachykinin NK-2 Receptor," Journal of Medicinal Chemistry, Dec. 2004, pp. 6935-6947, vol. 47, No. 27.

Graham, D. P., "Promoter Action in Reactions of Oxidation Concomitant with the Catalytic Decomposition of Hydrogen Peroxide, I. The Oxidation of Hyrazine," The Journal of the American Chemical Society, Aug. 1930, pp. 3035-3045, vol. 52, No. 8.

Sharma, Y. O., et al., "Green and Mild Protocol for Hetero-Michael Addition of Sulfur and Nitrogen Nucleophiles in Ionic Liquid," Journal of Molecular Catalysis A: Chemical, 2007, pp. 215-220, vol. 277, No. 1.

Yadav, J. S., et al., "Samarium (III) Triflate Catalyzed Conjugate Addition of Amines to Electron-Deficient Alkenes," Synthesis, 2007, pp. 3447-3450, No. 22.

* cited by examiner

*Primary Examiner* — Nicole M Buie-Hatcher
(74) *Attorney, Agent, or Firm* — Senniger Powers LLP

(57) ABSTRACT

A method of inhibiting hydrates in a fluid comprising water and gas comprising adding to the fluid an effective hydrate-inhibiting amount of a composition comprising one or more copolymers of N-alkyl (alkyl)acrylamide monomers and one or more cationic monomers selected from acid and alkyl chloride quaternary salts of N,N-dialkylaminoalkyl (meth)acrylates and N,N-dialkylaminoalkyl (meth)acrylamides.

22 Claims, No Drawings

METHOD OF CONTROLLING GAS HYDRATES IN FLUID SYSTEMS

CROSS-REFERENCE TO RELATED APPLICATION

This application is a continuation of U.S. patent application Ser. No. 12/253,504, filed on Oct. 17, 2008, the entire content of which is incorporated herein by reference.

TECHNICAL FIELD

This invention relates to inhibiting the formation and growth of hydrate particles in fluids containing hydrocarbon gas and water, particularly in the production and transport of natural gas, petroleum gas or other gases by treatment with a cationic polymer composed of mer units derived from N-alkyl (alkyl)acrylamide monomers and mer units derived from acid and alkyl chloride quaternary salts of N,N-dialkylaminoalkyl (meth)acrylates and N,N-dialkylaminoalkyl (meth)acrylamides.

BACKGROUND OF THE INVENTION

Modern oil and gas technologies commonly operate under severe conditions during the course of oil recovery and production. For instance, high pumping speed, high pressure in the pipelines, extended length of pipelines, and low temperature of the oil and gas flowing through the pipelines. These conditions are particularly favorable for the formation of gas hydrates, which can be significantly hazardous for oil productions offshore or for locations with cold climates.

Gas hydrates are ice-like solids that are formed from small nonpolar molecules and water at lower temperatures and at increased pressures. Under these conditions, the water molecules can form cage-like structures around these small nonpolar molecules (typically dissolved gases such as carbon dioxide, hydrogen sulfide, methane, ethane, propane, butane and iso-butane), creating a type of host-guest interaction also known as a clathrate or clathrate hydrate. The specific architecture of this cage structure can be one of several types (called type 1, type 2, type H), depending on the identity of the guest molecules. However once formed, these crystalline cage structures tend to settle out from the solution and accumulate into large solid masses that can travel by oil and gas transporting pipelines, and potentially block or damage the pipelines and or related equipment. The damage resulting from a blockage can be very costly from an equipment repair standpoint, as well as from the loss of production, and finally the resultant environmental impact.

The petroleum industry gives particular attention to clathrate hydrates because the conditions are often favorable for the formation of hydrates and subsequent blockages. There are many instances where hydrate blockages have halted the production of gas, condensate, and oil. Obviously, the monetary consequences for each of these instances are amplified when considering the volumes of production in deepwater applications where tens of thousands of barrels of oil are routinely produced daily and the shut-ins can take months to remedy. Additionally, restarting a shutdown facility, particularly in deep water production or transportation facility, is extremely difficult because of the significant amounts of time, energy, and materials, as well as the various engineering implementations that are often required to remove a hydrate blockage under safe conditions.

The industry uses a number of methods to prevent blockages such as thermodynamic hydrate inhibitors (THI), anti-agglomerates (AA), and kinetic hydrate inhibitors (KHI). The amount of chemical needed to prevent blockages varies widely depending upon the type of inhibitor that is employed. Thermodynamic hydrate inhibitors are typically used at very high concentrations (glycol is often used in amounts as high as 100% of the weight of the produced water), while KHI's and AA's are used at much lower concentrations (0.3-0.5% active concentration) and are typically termed low dose hydrate inhibitors (LDHIs).

Commonly it is accepted that KHI's interfere with the growth of the clathrate hydrate crystal, thus preventing the formation of the hydrates.

While AA's allow the crystal to form and then disperse the small crystal, KHI's prevent the formation of hydrate crystals by disrupting the crystal growth. It is commonly accepted that AA's act as dispersants of the hydrate crystals into the hydrocarbon phase, and therefore have a limitation that the liquid hydrocarbon phase must be present. Typically the liquid hydrocarbon to water ratio should be no greater then one to one to ensure that there is enough hydrocarbon to contain the dispersed hydrate crystals. Unfortunately, this limitation reduces the opportunity in the oilfield as many wells increase the amount of water produced very rapidly after the water breakthrough is observed.

There are several important factors to consider when evaluating the capabilities and performance of a hydrate inhibitor, but the most significant and directly relevant of these are the two factors subcooling and the hold time. Subcooling refers to the degree to which the temperature of the system can be lowered below the theoretical hydrate formation temperature at a given pressure, and is often referred to in terms of a $\Delta T$ value. The hold time refers to the amount of time that this sub-cooled system can be kept hydrate-free in the presence of a particular KHI. Thus a good KHI should have a large $\Delta T$ subcooling temperature, and be capable of long hold times at that temperature.

SUMMARY OF THE INVENTION

This invention is a method of inhibiting hydrates in a fluid comprising water, gas and optionally liquid hydrocarbon comprising treating the fluid with an effective hydrate-inhibiting amount of an inhibitor composition comprising one or more cationic polymers which comprise 99.9 to about 75 mole percent of mer units derived from one or more N-alkyl (alkyl)acrylamide monomers and 0.1 to 25 mole percent of mer units derived from one or more cationic monomers selected from acid and alkyl chloride quaternary salts of N,N-dialkylaminoalkyl (meth)acrylates and N,N-dialkylaminoalkyl (meth)acrylamides.

The inhibitor composition is effective to control gas hydrate formation and plugging in hydrocarbon production and transportation systems. This chemical effectively modifies the formation of hydrate crystals so that hydrocarbon fluids can be produced from the reservoir and transported to the processing facility without the risk of hydrate blockages.

The inhibitor composition also exhibits superior performance at high temperatures and salinities and is compatible with various corrosion inhibitors so that the inhibitor can be used in combination with the corrosion inhibitors without negatively impacting the performance of either.

DETAILED DESCRIPTION OF THE INVENTION

As used herein, "inhibiting" includes both inhibiting and preventing the formation and agglomeration of hydrate crystals.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

The hydrate inhibiting compositions of the invention comprise cationic copolymers composed of 99.9 to 75 mole percent of mer units derived from one or more N-alkyl (alkyl)acrylamide monomers and 0.1 to 25 mole percent of mer units derived from one or more cationic monomers selected from acid and alkyl chloride quaternary salts of N,N-dialkylaminoalkyl (meth)acrylates and N,N-dialkylaminoalkyl (meth)acrylamides.

Representative acid and alkyl chloride quaternary salts of N,N-dialkylaminoalkyl (meth)acrylates and N,N-dialkylaminoalkyl (meth)acrylamides include dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate sulfuric acid salt, acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, and the like.

Representative N-alkyl (meth)acrylamide monomers include N-methyl acrylamide, N-methyl methacrylamide, N-isopropylacrylamide, N-isopropyl methacrylamide, N-t-butyl acrylamide, N-t-butyl methacrylamide, and the like.

In an embodiment, the N-alkyl (alkyl)acrylamide monomer is N-isopropyl acrylamide or N-isopropyl methacrylamide.

In an embodiment, the cationic monomers are selected from alkyl chloride quaternary salts of N,N-dialkylaminoalkyl (meth)acrylates and N,N-dialkylaminoalkyl (meth)acrylamides.

In an embodiment, the cationic polymer is composed of about 95 to about 85 mole percent of mer units derived from one or more N-isopropyl (meth)acrylamide monomers and about 5 to about 15 mole percent of mer units derived from one or more cationic monomers selected from alkyl chloride quaternary salts of N,N-dialkylaminoalkyl (meth)acrylates and N,N-dialkylaminoalkyl (meth)acrylamides.

In an embodiment, the alkyl chloride quaternary salts of N,N-dialkylaminoalkyl (meth)acrylates are selected from dimethylaminoethyl acrylate methyl chloride quaternary salt, dimethylaminoethyl methacrylate methyl chloride quaternary salt, acrylamidopropyltrimethylammonium chloride and methacrylamidopropyltrimethylammonium chloride.

In an embodiment, the N-alkyl (meth)acrylamide is N-isopropyl methacrylamide.

In an embodiment, the cationic polymer is N-isopropyl methacrylamide-dimethylaminoethyl acrylate methyl chloride quaternary salt copolymer.

In an embodiment, the cationic polymer is N-isopropyl methacrylamide-methacrylamidopropyltrimethylammonium chloride copolymer.

The cationic polymers are prepared as known in the art. In a typical preparation, the N-alkyl (alkyl)acrylamide monomer(s), cationic monomers and solvent(s) are charged to a reactor and purged with nitrogen, then one or more initiators are charged to the reactor. Alternatively the initiator(s) may be charged once the reactor is heated to reaction temperature. Additional initiator may also be added near the completion of the polymerization to reduce residual monomer in the polymer composition. Once the reaction reaches reaction temperature and initiator has been charged, the reaction is heated for the requisite amount of time, then cooled to discharge the product.

In an embodiment polymerization is initiated by thermal decomposition of organic peroxides such as diacyl peroxides including lauroyl peroxide, succinic acid peroxide, benzoyl peroxide, and the like; hydrogen peroxide; hyroperoxides such as t-butyl hydroperoxide; dialkylperoxides including dicumyl peroxide, di (t-butyl) peroxide, and the like; and peroxiesters including t-butylperoxypivalate, t-butylperoxy-2-ethylhexanoate, OO-(t-Butyl) O-isopropyl monoperoxycarbonate, and the like.

In an embodiment, polymerization is initiated by thermal decomposition of t-butylperoxypivalate, t-butylperoxy-2-ethylhexanoate or OO-(t-Butyl) O-isopropyl monoperoxycarbonate.

In an embodiment, polymerization is initiated by thermal decomposition of t-butylperoxy-2-ethylhexanoate.

In an alternative embodiment, polymerization is initiated by redox decomposition of hydrogen peroxide or other similar hydroperoxides with a redox co-catalyst, such as $CuSO_4$ or $Fe_2(SO_4)_3$, and the like.

The polymerization may be conducted in any suitable solvent or mixture of solvents.

In an embodiment, the solvents are selected from low molecular weight alcohols, glycols or glycol ethers or mixtures thereof. Representative low molecular weight glycols, glycol ethers and alcohols include methanol, ethanol, butanol, iso-propanol, ethylene glycol, propylene glycol, 1,3-propanediol, glycerol, 1,1,1-tris(hydroxymethyl) propane, triethylene glycol dimethyl ether, diethylene glycol dimethyl ether, 2-ethoxyethanol, diethylene glycol monomethyl ether, diethylene glycol monobutyl ether, iso-2-butoxyethanol, 2-isopropoxyethanol, 2-butoxyethanol, ethylene glycol monobutyl ether, diethylene glycol monobutyl ether, propylene glycol butyl ether, and the like.

In an embodiment the solvent is a glycol ether solvent.

In an embodiment, the glycol ether solvent is diethylene glycol monoethyl ether.

In an embodiment, the solvent comprises one or more glycol ether solvents and one or more low molecular weight alcohols or glycols.

In an embodiment, the solvent comprises diethylene glycol monoethyl ether and one or more solvents selected from isopropanol, 2-ethoxyethanol and 1,1,1-tris(hydroxymethyl) propane.

In an embodiment, the cationic polymer has an average molecular weight of about 1,000 to 100,000 Dalton.

In an embodiment, the cationic polymer has a distribution of molecular weights with about 60-100 percent in the range of 1,000 to 20,000 Dalton and 0-25 percent in the range from 20,000 to 6,000,000 Dalton.

The composition and method of this invention is effective to control gas hydrate formation and plugging in hydrocarbon production and transportation systems. To ensure effective inhibition of hydrates, the inhibitor composition should be injected prior to substantial formation of hydrates. A preferred injection point for petroleum production operations is downhole near the near the surface controlled sub-sea safety valve. This ensures that during a shut-in, the product is able to disperse throughout the area where hydrates will occur. Treatment can also occur at other areas in the flowline, taking into account the density of the injected fluid. If the injection point is well above the hydrate formation depth, then the hydrate inhibitor should be formulated with a solvent with a density high enough that the inhibitor will sink in the flowline to collect at the water/oil interface. Moreover, the treatment can also be used for pipelines or anywhere in the system where there is a potential for hydrate formation.

The composition is introduced into the fluid by any means suitable for ensuring dispersal of the inhibitor through the fluid being treated. Typically the inhibitor is injected using mechanical equipment such as chemical injection pumps, piping tees, injection fittings, and the like. The inhibitor mixture can be injected as prepared or formulated in an additional polar or non-polar solvents as described herein depending upon the application and requirements.

Representative polar solvents suitable for formulation with the inhibitor composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like.

Representative of non-polar solvents suitable for formulation with the inhibitor composition include aliphatics such as pentane, hexane, cyclohexane, methylcyclohexane, heptane, decane, dodecane, diesel, and the like; aromatics such as toluene, xylene, heavy aromatic naptha, fatty acid derivatives (acids, esters, amides), and the like.

The particular formulation depends upon the application of the inhibitor composition and any additional treatments that will be used in conjunction with the KHI. For example, if the inhibitor composition will be injected with a paraffin inhibitor that is typically only formulated in non-polar solvents, solvents such as diesel, heavy aromatic naphtha, fatty acid methyl esters, xylene, toluene, and the like may be used. The inhibitor composition can also be formulated in a non-polar solvent to ensure that the risk of incompatibility is minimized.

Alternatively, if the inhibitor composition will be injected with a water soluble corrosion inhibitor or scale inhibitor, a polar solvent such as methanol, ethanol, isopropanol, 2-butoxyethanol, ethylene glycol, propylene glycol, and the like, can be used.

The amount of inhibitor composition used to treat the fluid is the amount that effectively inhibits hydrate formation and/or aggregation. The amount of inhibitor added can be determined by one of skill in the art using known techniques such as, for example, the rocking cell test described herein. Typical doses of formulated inhibitors range from about 0.05 to about 5.0 volume percent, based on the amount of the water being produced although in certain instances the dosage could exceed 5 volume percent.

The inhibitor composition of this invention may be used alone or in combination with thermodynamic hydrate inhibitors and/or anti-agglomerates as well as other treatments used in crude oil production and transport including asphaltine inhibitors, paraffin inhibitors, corrosion inhibitors, scale inhibitors, emulsifiers, water clarifiers, dispersants, emulsion breakers and the like.

Accordingly, in some embodiments, this invention further comprises treating the fluid with one or more thermodynamic hydrate inhibitors or one or more anti-agglomerates, or a combination thereof. The thermodynamic hydrate inhibitors and/or anti-agglomerates may be formulated with the inhibitor composition or added to the fluid separately. Individual inhibitors may also be added to the fluid at separate ports.

The effective amount of thermodynamic hydrate inhibitor and anti-agglomerate may be empirically determined based on the characteristics of the fluid being treated, for example using the rocking cell test described herein. Typically, the ratio of thermodynamic hydrate inhibitor to inhibitor is at least about 10:1.

In other embodiments, this invention further comprises treating the fluid with one or more asphaltene inhibitors, paraffin inhibitors, corrosion inhibitors, emulsion breakers or scale inhibitors, or a combination thereof.

In another embodiment, this invention comprises treating the fluid with a composition comprising the mixture of inhibitors and one or more emulsion breakers.

The foregoing may be better understood by reference to the following Examples, which are presented for purposes of illustration and are not intended to limit the scope of the invention.

Example 1

Preparation of a Representative IPMA-MAPTAC Copolymer

To a 100 mL 3-neck round-bottom flask equipped with a magnetic stir-bar, thermo-couple, condenser, and $N_2$ gas inlet is added of N-isopropyl methacrylamide monomer (IPMA, 9.80 g, 75 mmol, available from Aldrich, Milwaukee, Wis.) and methacrylamidopropyltrimethylammonium chloride (MAPTAC, 6.67 g, 15 mmol, 50 wt % aqueous solution, available from Aldrich, Milwaukee, Wis.) and diethylene glycol monethyl ether (59.96 g, 447 mmol) and the mixture is stirred at 500 rpm and purged with nitrogen for 30 minutes. The reaction mixture is then heated to 110° C. and t-butylperoctoate (2.94 g, 14 mmol) is added via syringe. The reaction mixture is maintained at 110° C. for 15 hours and then allowed to cool to ambient temperature with stirring to provide the product as a amber colored solution.

Representative polymers prepared according to the methods described below and their properties are shown in Tables 4-6.

Temperature of Agglomeration Protocol.

To a 20 mL glass vial equipped with a stir bar is added 10 mL of deionized water and 300 µL of inhibitor (3% dose). The vial is shaken vigorously for 1-2 minutes at ambient temperature and checked for particulates. If particulates or polymer coating on glass is detected "RT" is noted as the temperature of agglomeration $T_{agglomeration}$. If no particulates or polymer coating is noted, a small stir bar is added to the vial and the vial is placed in a temperature monitored/controlled water-bath (or other heat plate with thermocouple monitored temperature control) and stirring is initiated. The vila is then heated at 5° C. intervals allowing for 10 minutes of equilibration at each interval and the vial is checked for particulates or polymer coating as above. If particles or polymer coating is detected, the temperature is noted as $T_{agglomeration}$. If no particles or polymer coating is detected before at temperature of 90-95° C. is reached, stirring is continued for one hour. If no particles or coating of polymer is observed the test is considered a pass and value is denoted as none for $T_{agglomeration}$. If coating occurred during the one hour time period then $T_{agglomeration}$ is noted as 90-95° C.

Salinity Max Protocol.

To a 20 mL glass vial equipped with a stir bar is added 10 mL of premixed NaCl brine having a specified weight percent NaCl in deionized water and 300 µL of inhibitor (3% dose). The vial is shaken vigorously for 1-2 minutes at ambient temperature and checked for particulates. If particulates or polymer coating on glass is detected the weight percent of NaCo is noted as the Salinity Max value. If no particulates or polymer coating is noted, the test is repeated with increasing salinity brine until particulates or polymer coating is noted.

Autoclave Protocol.

A 200 mL total fluids solution is prepared as (a) Either 100% Water-Cut (WC) or (b) 75% (WC)+25% Condensate (often BG Synthetic Condensate). WC may be deionized water or a specific brine solution. The inhibitor is then dosed at the desired concentration (based on the water). An amount of water equal to inhibitor is subtracted so that the dose so water plus inhibitor adds up to total water-cut amount. Any other additives are added, the solution is placed in the autoclave and the autoclave temperature is equilibrated at 20° C. The autoclave chamber is then purged with the desired gas, charged to the desired pressure at about 20° C. The pressure is allowed to equilibrate at the desired pressure (generally about 60 bar initial at 20° C.), the solution is stirred for one hour at 20° C. and the temperature is ramped to the final set point temperature. (For 60 bar initial charge set-point temperature is about 4° C. for an approximately 22.5° F. (or 7° C. for 18° F.) sub-cooling with 100% WC and green canyon gas). The solution is stirred until fail or desired test length (shut-ins can be performed at any point as desired). The experiment is then terminated or the autoclave is heated at a desired rate to look at hydrate dissociation.

Rocking Cell Protocol.

The tests summarized in the tables below are performed in high pressure rocking cells. The testing conditions (pressure, temperature, oil, brine, water cut, etc.) are noted in Tables 1-3. Test results are shown in Tables 5-8.

Representative KHI's are tested under simulated field conditions. The fluids tested are shown in Table 1, the compositions of the fluids are shown in Table 2 and the test conditions are shown in Table 3. The KHI solution used is charged to the testing fluids as 3% of a 20% solution.

TABLE 1

Test Fluids

| Phase | Composition | Volume |
|---|---|---|
| Oil: | 25% Synthetic Condensate | 12 mL total liquid volume |
| Water: | 75% of total liquid volume | |
| Brine: | 0.5 wt % NaCl | |
| Gas: | Synthetic gas (Table 3) | |

TABLE 2

Synthetic gas composition - Type 2

| Component | mol % | Component | mol % |
|---|---|---|---|
| Nitrogen | 0.39% | iso-Butane | 0.49% |
| Methane | 87.26% | n-Butane | 0.79% |
| Ethane | 7.57% | iso-Pentane | 0.20% |
| Propane | 3.10% | n-Pentane | 0.20% |

TABLE 3

Test Conditions

| | |
|---|---|
| Initial charge pressure: | 1600 psi |
| Final test pressure: | 1600 psi |
| Initial start-up temperature: | 25° C. |
| Final test temperature: | 6° C. |
| Temperature ramp down time: | Less then 2 hours |
| Inhibitor concentration: | 0-5 vol % based on the amount of water |

The testing is carried out on a rocking cell apparatus as described in Dendy, Sloan E, *Clathrate Hydrates of Natural Gases*, Second Edition, Revised and Expanded, 1997, and Talley, Larry D. et al., "Comparison of laboratory results on hydrate induction rates in a THF rig, high-pressure rocking cell, miniloop, and large flowloop", *Annals of the New York Academy of Sciences*, 2000, 314-321 According to the following protocol.

Note that for all tests, average hold-times recorded are of the time of hydrate induction from set point.

TABLE 4

Effect of Comonomer Concentration on Performance

| | Polymer composition | | AutoClave 22.5° F. SC | Polymer Performance Solubility | |
|---|---|---|---|---|---|
| Sample # | Comonomer (coM) | % coM (mol %) | Hold-Time (hr) | $T_{agglomeration}$ (° C.) | Salinity Max (wt % NaCl) |
| 1 | — | — | not tested | RT | 0 |
| 2 | MAPTAC | 6.44 | not tested | RT | 0 |
| 3 | MAPTAC | 7.18 | not tested | RT | 0 |
| 4 | MAPTAC | 7.91 | not tested | RT | 0 |
| 5 | MAPTAC | 8.62 | 6.78 | 25[a] | 0 |
| 6 | MAPTAC | 9.32 | 16.86 | >90 | ~22.5 |
| 7[b] | MAPTAC | 14.49 | 9.35 | >90 | >17.5 |
| 8 | DMAEM | 4.14 | not tested | RT | 0 |
| 9 | DMAEM | 7.91 | not tested | RT | 0 |
| 10 | DMAEM | 17.39 | not tested | RT | 0 |
| 11 | DMAEM | 28.99 | not tested | RT | 0 |
| 12 | DMAEM·MCQ | 4.14 | not tested | RT | 0 |

TABLE 4-continued

Effect of Comonomer Concentration on Performance

| | Polymer composition | | AutoClave 22.5° F. SC | Polymer Performance Solubility | |
|---|---|---|---|---|---|
| Sample # | Comonomer (coM) | % coM (mol %) | Hold-Time (hr) | $T_{agglomeration}$ (° C.) | Salinity Max (wt % NaCl) |
| 13 | DMAEM·MCQ | 7.91 | not tested | RT | 0 |
| 14 | DMAEM·MCQ | 17.39 | not tested[b] | 30 | <0.5 |
| 15[b] | DMAEM·MCQ | 28.99 | not tested[b] | >90 | — |

[a]Was barely insoluble (almost unnoticeable precipitation occurred) w/ no further precipitation upon heating.
[b]Synthesis solution was very cloudy and polymer precipitated out over time (due to immiscibility issues at high quaternary comonomer concentrations)

Table 4 shows the differences in solubility of the IPMA copolymers with variations in the amount and type of comonomer used. As shown in Table 4, copolymers of IPMA with cationic monomers such as MAPTAC and DMAEM•MCQ outperform copolymers of IPMA with non-ionic monomers such as DMAEM. Note the polymers in which agglomeration occurred at ambient temperature ("RT") were not tested in the autoclave or for Salinity Max.

TABLE 5

Comparison of Polymer Solubility for Representative Polymers

| | Polymer composition | | Polymer Performance |
|---|---|---|---|
| Sample # | Comonomer (coM) | % coM (mol %) | Solubility $T_{agglomeration}$ (° C.) |
| 16 | — | 0 | ~35 |
| 17 | MAPTAC | 4.54 | 45-50 |
| 18 | MAPTAC | 5.4 | 50-55 |
| 19 | MAPTAC | 6.24 | 62-65 |
| 20 | MAPTAC | 7.06 | 70-72 |
| 21 | MAPTAC | 7.87 | 75-78 |
| 22 | MAPTAC | 8.67 | 85-90 |
| 23 | MAPTAC | 9.45 | 95/none[a] |
| 24 | MAPTAC | 10.21 | none |

[a]Polymer was on the boundary of its solubility (only very sight almost unnoticeable precipitation occurred upon heating).

The data shown in Table 5 further illustrates the effects of comonomer concentration on the solubility of the copolymer. A lower initiator concentration was used to prepare Samples 16-24 than for Samples 1-15. As shown in Table 5, inhibitor solubility increases with increasing comonomer incorporation. Samples 23 and 24 have hold-times at 22.5° F. sub-cooling of 2.43 and 4.59 hours respectively.

TABLE 6

Rocking-Cell 26° F. Sub-Cooling Comparison of Performance

| | Polymer composition | | Polymer Performance | |
|---|---|---|---|---|
| Sample # | Comonomer (coM) | % coM (mol %) | Corrosion Inhibitor | Hold-Time (hr) |
| 25 | — | — | none | 58.93 |
| 26 | — | — | A 100 ppm | 46.65 |
| 27 | — | — | B 100 ppm | 26.22 |
| 28 | MAPTAC | 9.32 | none | 71.98 |
| 29 | MAPTAC | 9.32 | A 100 ppm | Stopped after 82 hr |
| 30 | MAPTAC | 9.32 | B 100 ppm | 61.87 |

In Table 6, corrosion inhibitor A is a commercially available quaternary amine compound and corrosion inhibitor B is a mixture of imidazoline and phosphate ester corrosion inhibitors. The data in Table 6 shows the compatability of the inhibitors of the invention with common corrosion inhibitors.

While the present invention is described above in connection with representative or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of inhibiting hydrate formation in a fluid comprising water, gas and optionally liquid hydrocarbon comprising treating the fluid with an effective hydrate-inhibiting amount of an inhibitor composition comprising a cationic copolymer derived by polymerization of about 75 to about 99.9 mole percent of N-alkyl alkylacrylamide or N-alkyl acrylamide monomer units and about 0.1 to about 25 mole percent of alkylacrylamidoalkyltrialkylammonium chloride or acrylamidoalkyltrialkylammonium chloride monomer units.

2. The method of claim 1, wherein polymerization of said cationic copolymer is initiated by redox decomposition of a peroxide with a redox co-catalyst.

3. The method of claim 2, wherein the redox co-catalyst is $CuSO_4$ or $Fe_2(SO_4)_3$.

4. The method of claim 1, wherein said cationic copolymer has a molecular weight distribution of about 60-100 percent in the range of 1,000 to 20,000 Daltons and 0-25 percent in the range from 20,000 to 6,000,000 Daltons.

5. The method of claim 1, wherein said inhibitor composition further comprises a hydroxyl-containing compound selected from the group consisting of a low molecular weight alcohol, a low molecular weight glycol, a low molecular weight glycol ether, and combinations thereof.

6. The method of claim 5, wherein said hydroxyl-containing compound is selected from the group consisting of isopropanol; 1,1,1-tris(hydroxymethyl) propane; triethylene glycol dimethyl ether; diethylene glycol dimethyl ether; 2-ethoxyethanol; diethylene glycol monomethyl ether; ethylene glycol monobutyl ether; diethylene glycol monoethyl ether; diethylene glycol monobutyl ether; and combinations thereof.

7. The method of claim 1, wherein said cationic copolymer has an average molecular weight of about 1,000 to about 100,000 Dalton.

8. The method of claim 1, further comprising treating the fluid with a corrosion-inhibiting amount of a corrosion inhibitor.

9. The method of claim 8, wherein the corrosion inhibitor is water soluble.

10. The method of claim 9, wherein the corrosion inhibitor is selected from the group consisting of a quaternary amine-based corrosion inhibitor, an imidazoline-based corrosion inhibitor, a phosphate ester-based corrosion inhibitor, and combinations thereof.

11. The method of claim 9, wherein the water soluble corrosion inhibitor is a quaternary amine-based corrosion inhibitor.

12. The method of claim 1, wherein the inhibitor composition further comprises a corrosion inhibitor.

13. The method of claim 12, wherein the corrosion inhibitor is water soluble.

14. The method of claim 13, wherein the corrosion inhibitor is selected from the group consisting of a quaternary amine-based corrosion inhibitor, an imidazoline-based corrosion inhibitor, a phosphate ester-based corrosion inhibitor, and combinations thereof.

15. The method of claim 13, wherein the water soluble corrosion inhibitor is a quaternary amine-based corrosion inhibitor.

16. The method of claim 1, wherein the N-alkyl acrylamide monomer is N-isopropyl acrylamide.

17. The method of claim 1, wherein the N-alkyl (alkyl) acrylamide monomer is N-isopropyl methacrylamide.

18. The method of claim 1, wherein the acrylamidoalkyltrialkylammonium chloride monomer is acrylamidopropyltrimethylammonium chloride.

19. The method of claim 1, wherein the alkylacrylamidoalkyl-trialkylammonium chloride monomer is methacrylamidopropyltrimethylammonium chloride.

20. The method of claim 1, wherein the N-alkyl (alkyl) acrylamide monomer is N-isopropyl methacrylamide and the alkylacrylamidoalkyltrialkylammonium chloride monomer is methacrylamidopropyltrimethylammonium chloride.

21. The method of claim 1, wherein the cationic copolymer derived by polymerization of monomers consisting essentially of about 75 to about 99.9 mole percent of N-alkyl alkylacrylamide or N-alkyl acrylamide monomer units and about 0.1 to about 25 mole percent of alkylacrylamidoalkyltrialkylammonium chloride or acrylamidoalkyltrialkylammonium chloride monomer units.

22. The method of claim 1, wherein the cationic copolymer derived by polymerization of monomers consisting of about 75 to about 99.9 mole percent of N-alkyl alkylacrylamide or N-alkyl acrylamide monomer units and about 0.1 to about 25 mole percent of alkylacrylamidoalkyltrialkylammonium chloride or acrylamidoalkyltrialkylammonium chloride monomer units.

* * * * *